United States Patent
Ratan et al.

(10) Patent No.: US 7,198,232 B1
(45) Date of Patent: Apr. 3, 2007

(54) OPTIMAL SPEED MANAGEMENT FOR REACTION WHEEL CONTROL SYSTEM AND METHOD

(75) Inventors: Santosh Ratan, Highland Park, NJ (US); Xipu Li, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 165 days.

(21) Appl. No.: 10/926,092

(22) Filed: Aug. 26, 2004

(51) Int. Cl.
*B64G 1/28* (2006.01)
(52) U.S. Cl. .......................................... 244/165; 701/13
(58) Field of Classification Search ................ 244/164, 244/171, 165; 701/13
See application file for complete search history.

(56) References Cited

U.S. PATENT DOCUMENTS

| | | |
|---|---|---|
| 5,058,835 A | 10/1991 | Goodzeit et al. |
| 6,141,606 A | 10/2000 | Reckdahl |
| 6,481,672 B1 | 11/2002 | Goodzeit et al. |
| 6,600,976 B1 | 7/2003 | Goodzeit et al. |

OTHER PUBLICATIONS

Introduction To Matrix Computations, by G.W. Stewart, Chapter 4, pp. 160-207, Academic Press, New York, 1973.

*Primary Examiner*—Timothy D. Collins
(74) *Attorney, Agent, or Firm*—McDermott Will & Emery LLP.

(57) ABSTRACT

A spacecraft attitude control system and method in which an attitude controller is configured for sensing three-dimensional attitude of the spacecraft, and producing torque signals for stabilizing the spacecraft in a prescribed attitude in space. At least four mutually skew reaction wheels are rotated in response to the torque control signals for storing three-dimensional angular momentum, and speeds of rotation of the wheels are measured. A reaction wheel speed control processor, responsive to reaction wheel torque and speed for producing reaction wheel spin control signals, implements an infinity-norm algorithm for causing the nullspace components of wheel speed to re-distribute a desired three-dimensional stabilizing momentum of the spacecraft in such a manner that the maximum speeds of rotation of all the reaction wheels is minimized. As a result, periods between successive momentum dumping maneuvers are prolonged to the maximum possible.

11 Claims, 3 Drawing Sheets

OPTIMAL SPEED MANAGEMENT FOR REACTION WHEEL CONTROL SYSTEM AND METHOD

TECHNICAL FIELD

This disclosure relates generally to spacecraft attitude control, and more particularly to a novel attitude control system and method in which momentum is distributed optimally among four or more on-board reaction wheels.

BACKGROUND OF THE DISCLOSURE

Orbiting spacecraft are used for a large variety of sensing and communication applications. For photographic purposes, it may be desirable for the spacecraft to be relatively near the Earth, so that the cameras or sensors are close to the subjects. For communication purposes, a geosynchronous equatorial orbit is often desirable. Whatever the orbit, a satellite must be stabilized in space if the sensors or antennas are to be pointed in appropriate directions.

Spacecraft attitude stabilization may be accomplished by spinning the spacecraft and by mounting the sensors or antennas on a despun platform. Alternatively, the spacecraft may be stabilized in three axes. Three-axis stabilization may be accomplished by a control system using fuel-burning thrusters, but the use of such thrusters requires the expenditure of fuel, which tends to limit the service life of the spacecraft. Another method for three-axis stabilization uses magnetic coils or torquers which interact with the magnetic fields of the heavenly body providing the desired torques. Magnetic torquers have the disadvantages that the available torques tend to be small, and undesirably dependent upon the local magnitude of the magnetic field of the heavenly body being orbited. The magnetic fields change from time to time and from location to location.

Larger torques than those available by the use of magnetic torquers may be achieved with electrically driven reaction wheels (RWA). Such wheels are also electrically driven and have the advantage of being able to provide relatively large torques regardless of orbital position.

In principle, a three-axis stabilized spacecraft requires only three mutually orthogonal, or non-planar, reaction wheels or momentum wheels. In order to provide for redundancy in the event that one of three orthogonal wheels should fail, spacecraft often include at least one additional reaction wheel, oriented such that it is non-planar with any other two RWAs. The fourth wheel provides redundancy for all three wheels. Thus, the fourth wheel may be used in conjunction with two of the other wheels to control the spacecraft attitude.

In addition, increased expectations relating to the performance of spacecraft and improved capabilities have led to a continuing increase in the size of spacecraft. This increased size in turn requires greater torque and momentum capability along each control axis. Rather than use three reaction wheels with a fourth wheel, aside from redundancy, it has been found that there are advantages to using four or more skewed smaller reaction wheels to obtain the required momentum and torque. When four or more reaction wheels are used, modern control techniques utilize all the wheels during operation.

During attitude control operations, the various RWAs are accelerated and decelerated to apply torques to the spacecraft body. In this process the RWAs, and thus the spacecraft accumulate momentum over time. The vector sum of all the RWA momentum is referred as the total spacecraft momentum.

In cases where number of wheels is four or more, the total spacecraft momentum can be stored in the set of wheels in infinitely many ways due to the under-determined nature of the problem, or the existence of the wheel null-space. For example, one way to distribute zero momentum is to have every wheel spin at zero speed. Another way is to have all the wheels spin at non-zero speeds such that the set of speeds form a wheel speed null vector, or the vector sum of all the individual wheel momentums is zero.

Prior art speed management arrangements drove the wheel speeds toward power optimal values. In these prior art arrangements, the net momentum is distributed such that the square root of the sum of the squares of all the individual wheel momentums/speeds is minimized. This is also equivalent to minimization of the 2-norm of the speed vector, or to having zero components of the wheel speed vector along the null-space.

In systems implementing RWAs for attitude control, a wheel may reach its maximum speed, even though the total wheel stored momentum is small. This requires periodic momentum dumping by firing thrusters from time to time. It is desirable to prolong periods between momentum-dumping maneuvers in order to reduce operational efforts and thruster fuel expenditure. In cases where the number of wheels is four or greater, a given amount of momentum in the spacecraft body coordinate frame can be stored in the set of wheels in infinitely many ways due to the existence of wheel speed null space. In the prior art, the net momentum is distributed such that the square root of the sum of the squares of all the individual wheel momentums/speeds is minimized. This is also equivalent to minimization of the 2-norm of the speed vector, or to having zero components of the wheel speed vector along the null-space.

For example, described in U.S. Pat. No. 5,058,835 issued Oct. 22, 1991 to Goodzeit et al. entitled WHEEL SPEED MANAGEMENT CONTROL SYSTEM FOR SPACECRAFT is a system of wheel speed management for a spacecraft that uses at least four reaction wheels for attitude control. This system monitors the wheel speeds and generates a wheel speed error vector. The error vector is integrated, and the error vector and its integral are combined to form a correction vector. The correction vector is summed with the attitude control torque command signals for driving the reaction wheels. An improvement disclosed in U.S. Pat. No. 6,141,606 issued Oct. 31, 2000 to Reckdahl entitled WHEEL SPEED CONTROL SYSTEM FOR A SPACECRAFT WITH REJECTION OF NULL SPACE WHEEL MOMENTUM controls wheel speed nullspace components instead of wheel speed errors.

These systems are effective to maintain each reaction wheel at its power optimal speed so as to keep the total wheel proven minimum. Both are based on minimization of the 2-norm RWA speeds to reduce RWA energy requirements. The drawback of the methods is that simply minimizing maximum energy into the system does not minimize the maximum speed of the fastest of the reaction wheels, and hence does not provide the longest possible periods between momentum dumping maneuvers. This results in more than necessary fuel consumption and active ground involvement.

Desired is an improvement, in which the maximum angular speeds of all the reaction wheels are minimized, so that momentum dumping is least frequently carried out, and concomitant fuel consumption and ground involvement minimized.

SUMMARY OF THE DISCLOSURE

Described is spacecraft implementing a novel reaction wheel assembly speed management system and method in which need for momentum dumping is minimized. The system comprises an attitude controller configured for sensing three-dimensional attitude of the spacecraft and producing torque control signals for stabilizing the spacecraft in a prescribed three-dimensional attitude in space, and at least four mutually skew reaction wheels which are rotated in response to the torque control signals for applying the control torques and storing three-dimensional angular momentum. Reaction wheel speed measuring devices are employed for generating reaction wheel speed signals, and a reaction wheel speed control processor, responsive to the torque control and reaction wheel speed signals, produce reaction wheel spin control signals so as to redistribute a desired three-dimensional stabilizing momentum to the spacecraft in all RWAs in such a manner that the maximum speed of rotation of all the reaction wheels at any moment, is minimized.

In accord with an aspect of the disclosure, the reaction wheel speed control processor causes the nullspace vector components of the reaction wheel speeds to move towards specified values, that may be computed in order to minimize the infinity norm of the wheel speed vectors.

A method of implementing optimal speed management, in accord with the disclosure, comprises sensing the attitude of the spacecraft to produce attitude signals, processing the attitude signals to produce torque control signals representative of the torques required to maintain the spacecraft stabilized at a prescribed three-dimensional attitude in space, and spinning at least four mutually skewed reaction wheels on the spacecraft in response to the torque control signals. Speeds of the wheels are sensed to produce wheel speed signals, which in an exemplary embodiment may be processed based on an infinity-norm optimization algorithm and the nullspace vector to compute, from reaction wheel speed, an error torque for varying the torque control signals for individual wheels. This error torque may be applied so as to redistribute a desired three-dimensional momentum of the spacecraft among all RWAs in such a manner that the maximum speed of rotation of all the reaction wheels is minimized.

DETAILED DISCLOSURE

The 2-norm and infinity-norm of a n-dimensional vector $v=[v_1\ v_2\ \ldots\ v_n]^T$ are defined respectively as $$\|v\|_2 = \sqrt{\sum_i^n v_i^2} = \sqrt{v^T v} \tag{1}$$

$$\|v\|_\infty = \max\{|v_i| : i = 1, 2, \ldots, n\} \tag{2}$$

Figure 1:
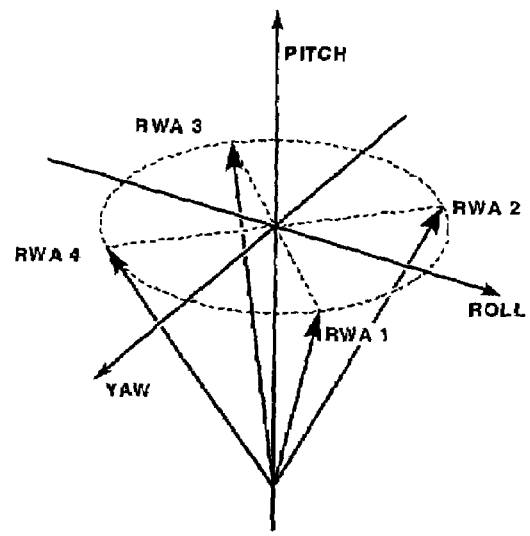
FIG. 1 is a symbolic drawing showing spin axis orientations of a four-wheel reaction wheel assembly (RWA), implemented in accord with the disclosure.

In the remainder of the disclosure, a four-wheel configuration is assumed for simplicity in the description of the invention. It is straight forward to extend the disclosure herein to apply to systems containing a greater number of wheels. FIG. 1 shows a typical orientation of 4 wheels with respect to the spacecraft body frame.

Based on the mount orientation, the RWAs to the spacecraft body transformation can be formed as $$T=[r_1\ r_2\ r_3\ r_4] \tag{3}$$

where $r_i$ is the $i^{th}$ wheel spin unit vector (direction of the wheel spin) expressed in the spacecraft body frame. The relationship between individual wheel momentum vector $v_{RWA}$ and the net momentum vector $v_{sc}$ in the spacecraft body frame is given by $$v_{SC}=Tv_{RWA} \tag{4}$$

Since T is a full row-rank 3×4 matrix, there exists infinity number of ways $v_{RWA}$ can be calculated corresponding to a given $v_{sc}$, the form of all of which is $$v_{RWA}=v^P_{RWA}+\alpha n \tag{5}$$

where $v^P_{RWA}$ is a particular solution (for example the minimum 2-norm solution), α is an arbitrary real number, and n is the null vector of T. That is, $$n=[n_1 n_2 n_3 n_4]^T \tag{6}$$

such that $$Tn=0 \tag{7}$$

Equation (7) implies that a wheel momentum vector along the null vector will produce zero net momentum in the spacecraft frame, hence α can assume any value (real number), and $v_{RWA}$ can result in the same net momentum in the spacecraft frame. Therefore, the freedom to choose α in the second term of Equation (5) can be used to optimize the final solution to achieve a certain criterion. The prior art 2-norm optimization is achieved by selecting α so that the final solution $v^2_{RWA}$ has the minimum length among all $v_{RWA}$ given by Equation (5), and which is shown schematically in FIG. 2. However, in accord with an aspect of the invention, the parameter α is selected to minimize the infinity-norm of $v_{RWA}$ in Equation (5).

Figure 2:
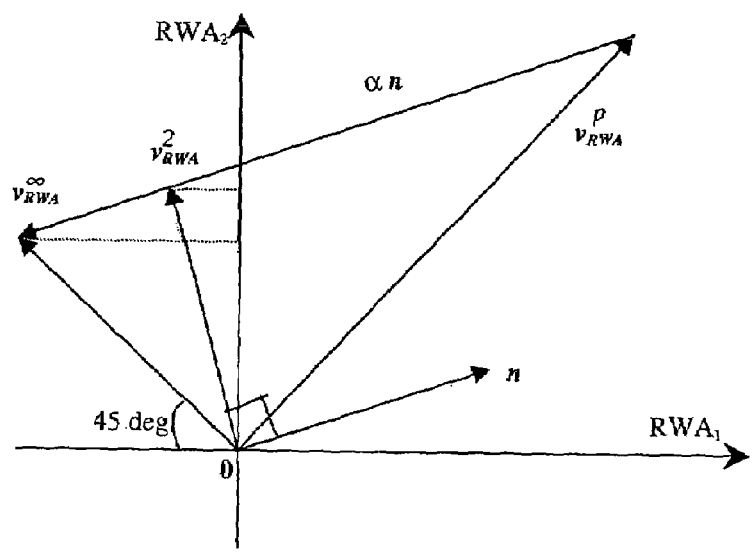
FIG. 2 is a graph illustrating, respectively, prior art two-norm and novel infinity-norm solutions, in accord with the disclosure.

Infinity-norm optimization, which occurs at the infinity-norm solution, shown schematically in FIG. 2, results in the minimum of the maximum speeds of the four wheels. By inspection of this Figure, it is apparent that while 2-norm optimization yields a minimum rss speed (which corresponds to the length of the speed vector) solution, the infinity-norm optimization solution yields a smaller maximum speed among wheels than that of the 2-norm solution. That is, although the infinity-norm solution does not necessarily maintain power-optimal sets of wheel speeds within the RWA, it produces sets of wheel speeds whose maximum speed is minimum. This achieves an advantageous effect of prolonging periods of time between momentum dumping maneuvers, and hence conserves fuel.

Figure 3:
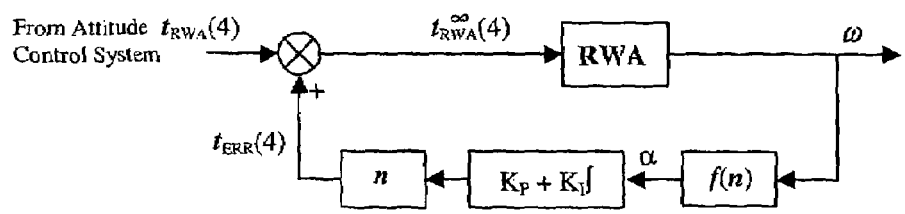
FIG. 3 is a block diagram describing a control system implementing infinity-norm optimization of RWA speed.

FIG. 3 is a block diagram of a part of the system using the principle disclosed herein to optimally manage the wheel speeds. $K_p$ and $K_1$ are feedback proportional and integral gains, $\alpha$ is the speed management error, and $t_{ERR}$ is the feedback compensation torque. The feedback loop operates on the measured wheel speeds $\omega$. Integration in the feedback loop serves to stabilize the control system. The null vector(s) n is pre-stored in the system. An infinity norm optimization algorithm is used to compute the value of $\alpha$. In one exemplary embodiment, the algorithm determines $\alpha$ in the following manner:

$$\text{for } (i, j) \in \{(1, 2), (1, 3), (1, 4), (2, 3), (2, 4), (3, 4)\}$$

$$\text{sign} = 1$$

$$\text{if } (n_i * n_j) > 0, \text{ then sign} = -1$$

$$\beta_{ij} = \frac{\text{sign} * \omega_j - \omega_i}{n_i - \text{sign} * n_j}$$

$$\text{if } |\omega_k + \beta_{ij} n_k| \leq |\omega_i + \beta_{ij} n_i| \text{ for all } k \in \{1, 2, 3, 4\} - \{i, j\}$$

$$\text{then } \alpha = \beta_{ij}$$

This algorithm is denoted by f(n) in the block diagram. Note that there could be many alternatives to this algorithm, and it can be tailored to specific cases also. As the 4-wheel speed vector $\omega$ reaches the infinity norm optimal solution, $\alpha$ approaches zero.

Simulation

Figure 4:
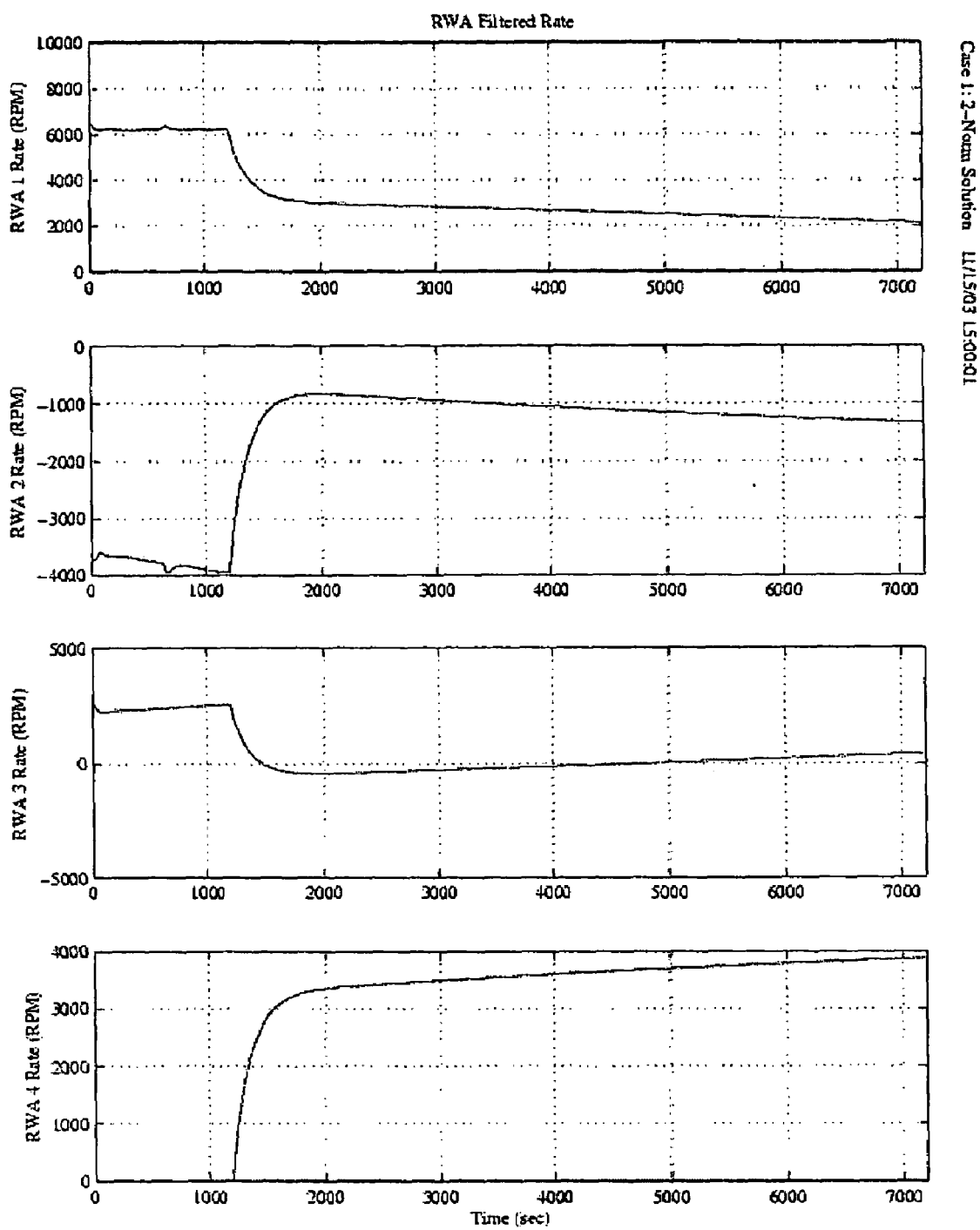
FIG. 4 is a series of graphs showing reaction wheel speeds in a simulated RWA control implementing prior art two-norm optimization of wheel speeds.
Figure 5:
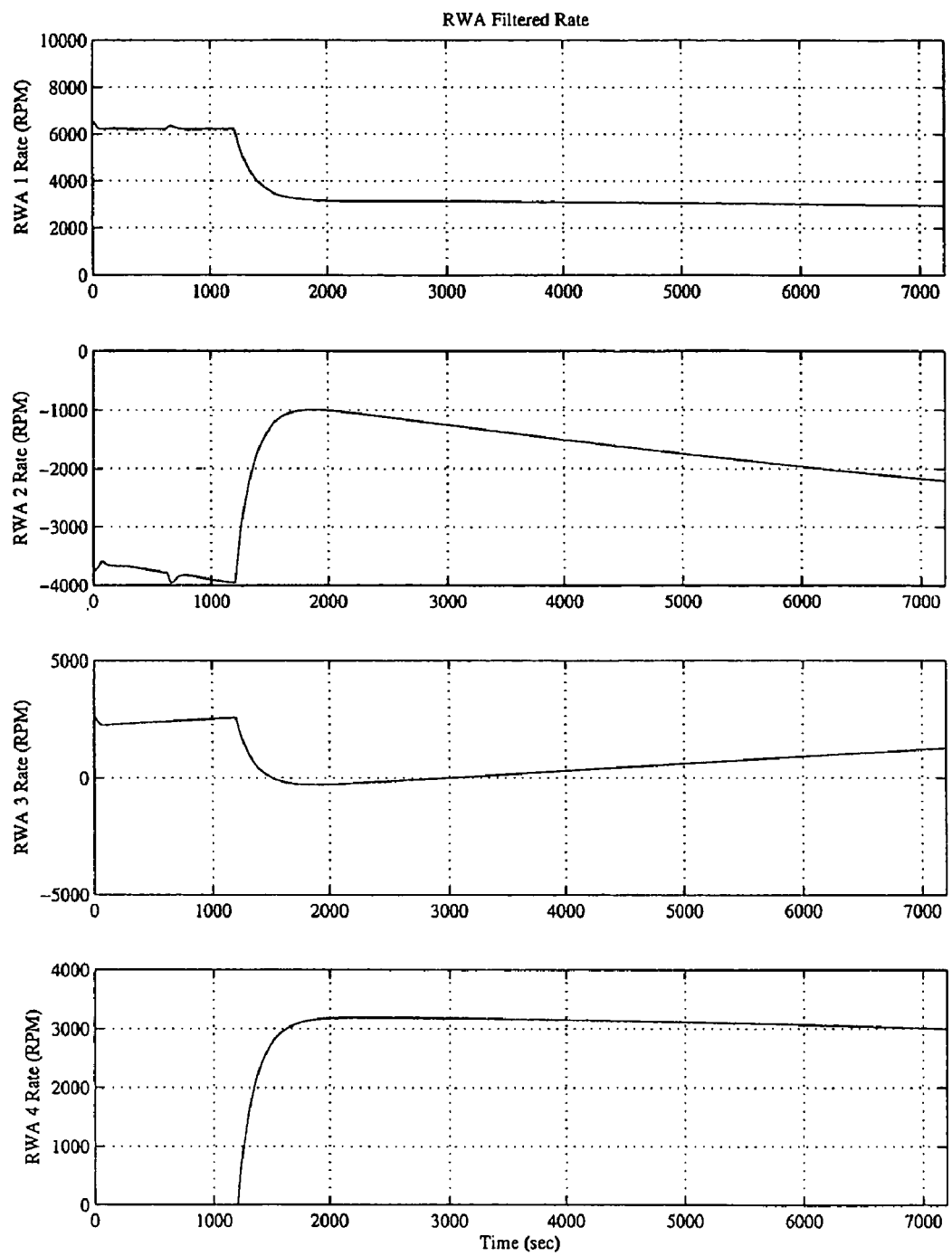
FIG. 5 is a series of graphs showing reaction wheel speeds in a simulated RWA control implementing infinity-norm optimization.

The following simulation example demonstrates the superiority of infinity-norm optimization of wheel speeds, as disclosed herein. Two simulation test cases are presented. Case 1 (FIG. 4) uses the conventional 2-norm method, and Case 2 (FIG. 5) uses the disclosed (infinity norm) method. In both cases, the simulation starts with 3-wheel active configuration. At 1200 seconds, the fourth wheel is turned on, which activates the RWA speed management logic to redistribute the RWA momentum. With the identical control performance, it can be seen that the maximum speed of the 4 RWAs in case 1 is always higher than that in case 2 after speed convergence (2000 seconds into simulation) of all the 4 RWAs. At 7000 seconds, for example, the RWA speeds for case 1 is (2100, −1200, 350, 3900) RPM and for case 2 is (3000, −2150, 1500, 3000) RPM. The maximum speed of 3900 RPM in case 1 is 30% higher than that of 3000 RPM in case 2. This clearly demonstrates that using the disclosed method the system of 4 RWAs can store 30% more momentum than using the prior art 2-norm method in this example.

In summary, the invention described herein provides an optimal method of distributing the momentum to all the wheels, so that the periods between momentum dumping maneuvers may be maximized. Using this method, wheel momentum storage capability is utilized to its fullest. This method is based on minimizing the infinity-norm of the wheel speed vector using the null vector(s) of the wheel speeds. In the description given by way of example, a four-wheel scenario is presented. The extension of the principles herein into more than four wheel scenario is straightforward.

What is claimed is:

1. A spacecraft, comprising:
   an attitude controller configured for sensing three-dimensional attitude of the spacecraft and producing torque control signals for stabilizing the spacecraft in a prescribed three-dimensional attitude in space;
   at least four mutually skewed reaction wheels which are rotated in response to the torque control signals for storing three-dimensional angular momentum;
   reaction wheel speed measuring devices for generating reaction wheel speed signals; and
   a reaction wheel speed control processor responsive to the torque control and reaction wheel speed signals for producing reaction wheel spin control signals so as to re-distribute a desired three-dimensional momentum of the spacecraft among all the reaction wheels in such a manner that the maximum speed of rotation of all the reaction wheels is minimized.

2. The spacecraft according to claim 1, wherein the reaction wheel speed control processor causes nullspace vector components of the reaction wheel speeds to move towards specified values.

3. The spacecraft according to claim 2, in which the nullspace vector components are computed by minimizing the infinity norm of the wheel speed vectors.

4. The spacecraft according to claim 3, wherein the reaction wheel speed control processor is configured for computing a speed management error, $\alpha$, which is applied to cause the nullspace vector components to produce a torque error signal that is summed with the torque control signal for each reaction wheel.

5. The spacecraft according to claim 4, in which for a four reaction wheel system, the speed management error, $\alpha$, is computed in the following manner:

$$\text{for } (i, j) \in \{(1, 2), (1, 3), (1, 4), (2, 3), (2, 4), (3, 4)\}$$

$$\text{sign} = 1$$

$$\text{if } (n_i * n_j) > 0, \text{ then sign} = -1$$

$$\beta_{ij} = \frac{\text{sign} * \omega_j - \omega_i}{n_i - \text{sign} * n_j}$$

$$\text{if } |\omega_k + \beta_{ij} n_k| \leq |\omega_i + \beta_{ij} n_i| \text{ for all } k \in \{1, 2, 3, 4\} - \{i, j\}$$

$$\text{then } \alpha = \beta_{ij}$$

where
$n_i$: $i^{th}$ component of the speed null-vector
$w_i$: $i^{th}$ RWA speed.

6. The spacecraft according to claim 3, wherein the processor integrates the speed management error.

7. A method for controlling spacecraft attitude, comprising the steps of:
   sensing the attitude of the spacecraft to produce attitude signals;
   processing the attitude signals to produce torque control signals representative of the torques required to maintain the spacecraft stabilized at a prescribed three-dimensional attitude in space;
   spinning at least four mutually skewed reaction wheels on the spacecraft in response to the torque control signals;
   sensing the speeds of the wheels to produce wheel speed signals;
   processing the wheel speed signals based on an infinity-norm optimization algorithm and the nullspace vector to compute, from reaction wheel speed, an error torque for varying the torque control signals, so as to impart a desired three-dimensional stabilizing momentum to the spacecraft in such a manner that the maximum speed of rotation of all the reaction wheels is minimized.

8. The method as recited in claim 7, wherein the step of processing causes nullspace vector components of the reaction wheel speeds to move towards specified values.

9. The method as recited in claim 8, in which the nullspace vector speed components are computed by minimizing the infinity norm of the wheel speed vectors.

10. The method as recited in claim 9, wherein the step of processing includes computing a speed management error, $\alpha$, which is applied to cause the nullspace vector components to produce a torque error signal that is summed with the torque control signal for each reaction wheel.

11. A method for controlling spacecraft attitude, comprising the steps of:

sensing the attitude of the spacecraft to produce attitude signals;

processing the attitude signals to produce torque control signals representative of the torques required to maintain the spacecraft stabilized at a prescribed three-dimensional attitude in space;

spinning at least four mutually skewed reaction wheels on the spacecraft in response to the torque control signals;

sensing the speeds of the wheels to produce wheel speed signals;

processing the wheel speed signals to compute, from reaction wheel speed, an error torque for varying the torque control signals, so as to impart a desired three-dimensional stabilizing momentum to the spacecraft in such a manner that the maximum speed of rotation of all the reaction wheels is minimized.

* * * * *